United States Patent
Lacroix

(10) Patent No.: US 10,254,836 B2
(45) Date of Patent: Apr. 9, 2019

(54) HAPTIC POWER CONSUMPTION MANAGEMENT

(71) Applicant: Immersion Corporation, San Jose, CA (US)

(72) Inventor: Robert A. Lacroix, Saint-Lambert (CA)

(73) Assignee: IMMERSION CORPORATION, San Jose, CA (US)

( * ) Notice: Subject to any disclaimer, the term of this patent is extended or adjusted under 35 U.S.C. 154(b) by 167 days.

(21) Appl. No.: 14/573,374

(22) Filed: Dec. 17, 2014

(65) Prior Publication Data

US 2015/0241972 A1 Aug. 27, 2015

Related U.S. Application Data

(60) Provisional application No. 61/942,868, filed on Feb. 21, 2014.

(51) Int. Cl.
| | |
|---|---|
| *G06F 1/32* | (2006.01) |
| *G06F 1/16* | (2006.01) |
| *G06F 3/01* | (2006.01) |
| *G06F 1/3234* | (2019.01) |

(52) U.S. Cl.
CPC .............. *G06F 3/016* (2013.01); *G06F 1/163* (2013.01); *G06F 1/325* (2013.01); *G06F 3/014* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 8,397,087 B1* | 3/2013 | Gardner | G06F 1/329 713/300 |
| 9,335,821 B2* | 5/2016 | Ryu | G06F 3/016 |
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,760,166 B2 | 9/2017 | Ammi et al. | |

(Continued)

FOREIGN PATENT DOCUMENTS

| | | |
|---|---|---|
| CN | 1924775 A | 3/2007 |
| CN | 102005620 A | 4/2011 |
| WO | 2011097020 A2 | 8/2011 |

OTHER PUBLICATIONS

Immersion Corporation; "Haptic Technologies Consume Minimal Power in Smart Phones"; Jun. 2012; pp. 1-8.

*Primary Examiner* — William Boddie
*Assistant Examiner* — Bipin Gyawali
(74) *Attorney, Agent, or Firm* — Miles & Stockbridge P.C.

(57) ABSTRACT

A haptically-enabled system retrieves a haptic effect definition in response to a request for a haptic effect and receives a power consumption management mode. The system modifies the haptic effect definition based at least in part on the power consumption management mode and converts the modified haptic effect definition into a haptic effect signal. The system then applies the haptic effect signal to a haptic output device.

19 Claims, 2 Drawing Sheets

(56) References Cited

U.S. PATENT DOCUMENTS

| | | |
|---|---|---|
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 10,007,318 B2* | 6/2018 | Yu .................. G06F 1/3206 |
| 2002/0033795 A1 | 3/2002 | Shahoian |
| 2006/0095864 A1* | 5/2006 | Mock .................. G06F 1/3203 715/810 |
| 2010/0188327 A1 | 7/2010 | Marcos |
| 2011/0109423 A1* | 5/2011 | Ramsay .................. B25J 9/1689 340/3.1 |
| 2012/0295672 A1* | 11/2012 | Kim .................. H04M 1/2745 455/573 |
| 2014/0232677 A1* | 8/2014 | Yamane .................. G06F 3/041 345/173 |
| 2015/0005039 A1* | 1/2015 | Liu .................. H04M 1/72569 455/567 |
| 2015/0309535 A1* | 10/2015 | Connor .................. G06F 1/163 361/679.03 |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Bray et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

\* cited by examiner

HAPTIC POWER CONSUMPTION MANAGEMENT

CROSS REFERENCE TO RELATED APPLICATIONS

This application claims priority of U.S. Provisional Patent Application Ser. No. 61/942,868, filed on Feb. 21, 2014, the disclosure of which is hereby incorporated by reference.

FIELD

One embodiment is directed generally to haptic effects, and in particular to power management of devices that generate haptic effects.

BACKGROUND INFORMATION

Portable/mobile electronic devices, such as mobile phones, smartphones, camera phones, cameras, personal digital assistants ("PDA"s), wearable devices, etc., typically include output mechanisms to alert the user of certain events that occur with respect to the devices. For example, a cell phone normally includes a speaker for audibly notifying the user of an incoming telephone call event. The audible signal may include specific ringtones, musical ditties, sound effects, etc. In addition, cell phones may include display screens that can be used to visually notify the users of incoming phone calls.

In some mobile devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

For a wearable device, tactile feedback is an ideal means for alerting and notifying users in a completely discreet and non-visual manner. Information about unread messages, appointments and location based notifications can be communicated via wearable technology because the tactile effects both inform users without requiring full attention, and do so without socially disruptive audio alerts or visual distraction.

SUMMARY

One embodiment is a haptically-enabled system. The system retrieves a haptic effect definition in response to a request for a haptic effect and receives a power consumption management mode. The system modifies the haptic effect definition based at least in part on the power consumption management mode and converts the modified haptic effect definition into a haptic effect signal. The system then applies the haptic effect signal to a haptic output device, such as an actuator.

DETAILED DESCRIPTION

One embodiment is a power management system for a haptically-enabled device. The system monitors energy consumption of the device and implements energy savings functionality when generating haptic effects. Therefore, the device can maintain a longer life between charges.

As discussed above, many different haptically-enabled devices exist that include a haptic system that generates haptic effects. For many of these devices, especially non-mobile devices, the power consumption needed to generate haptic effects is largely irrelevant. However, power consumption, and battery life, are always a key concern in mobile devices. Longer life between charges is seen as very valuable by consumers. Even with mobile devices such as smartphones, where minimizing the power consumption associated with mobile device applications is a constant concern, the power consumption from haptic effects in relatively small. Studies have shown that under worst-case usage scenarios for a 24-hour period, typical haptic effects consume from 0.95 to 4.11 percent of the device battery capacity, depending on the use case.

However, wearable devices generally have an increased need to reduce power consumption. Most wearable devices are expected to last many days or weeks between charges, as opposed to some smartphones that are expected to be charged nightly. As a consequence, wearable devices have a tight energy budget for generating haptic effects in view of a typically (e.g., ~250 mAh) battery that is expected to work for up to 7 days between charges. Relative to smartphones, the haptic effects on a wearable device can potentially consume a large chunk of the power budget.

Figure 1:
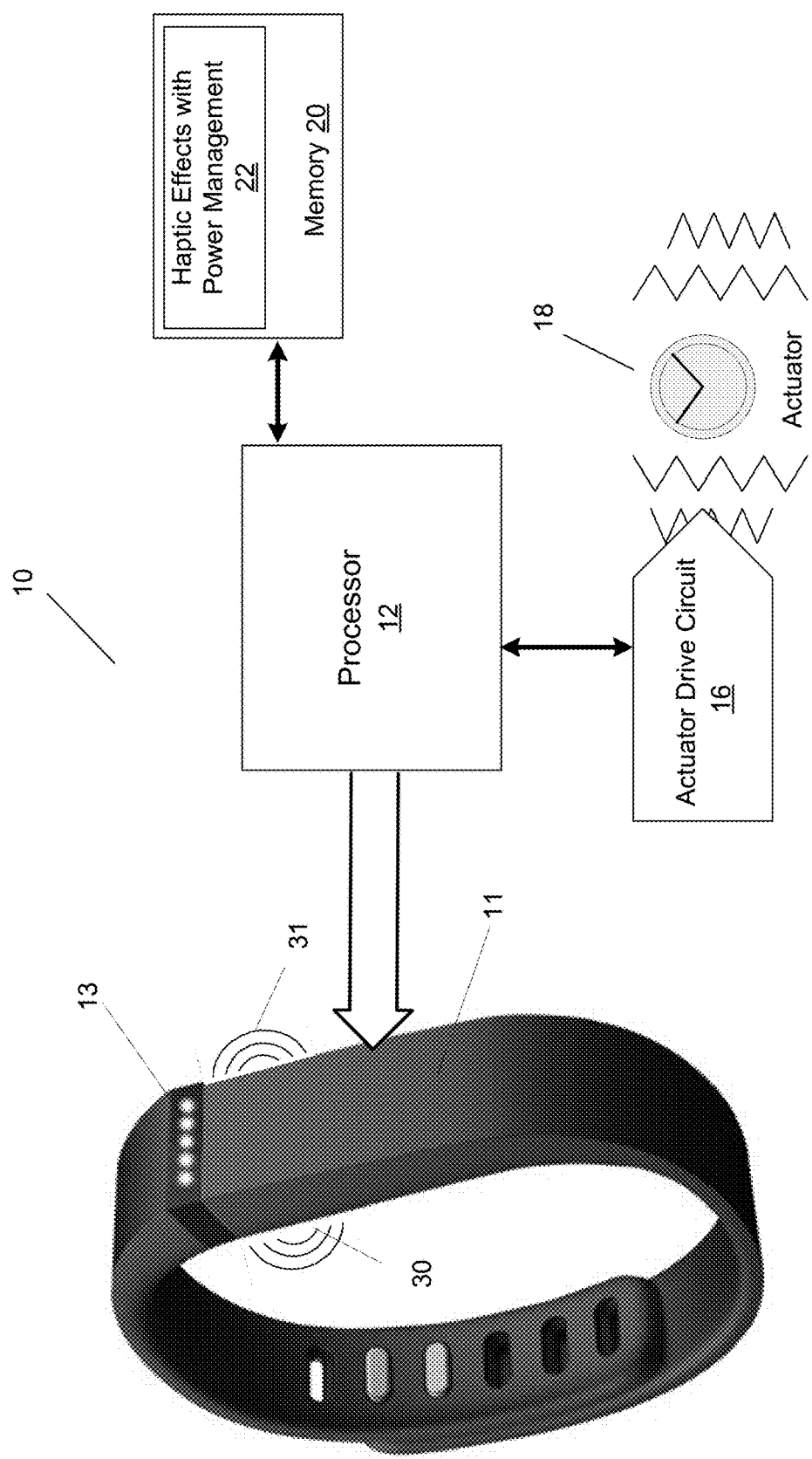
FIG. 1 is a block diagram of a haptically-enabled device/system in accordance with one embodiment of the present invention.

FIG. 1 is a block diagram of a haptically-enabled device/system 10 in accordance with one embodiment of the present invention. System 10 may be any type of mobile or non-mobile device that generates haptic effects. In the example of FIG. 1, system 10 is a wearable device in the form of a bracelet that can be used to monitor the user's heart rate, blood pressure, etc., track steps, distance, stairs climbed, calories burned and active minutes, or monitor the user's sleep. System 10 may include a display 13 and a touch surface 11 that recognizes touches, and may also recognize the position and magnitude of touches on the surface.

System 10 includes a haptic feedback system that includes a processor or controller 12. Coupled to processor 12 is a memory 20 and an actuator drive circuit 16, which is coupled to an actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. The haptic feedback system in one embodiment generates vibrations 30, 31 on system 10.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects with power management module 22 which are instructions that, when executed by processor 12, generate drive signals for actuator 18 that provide haptic effects with power management, as disclosed in more detail below. Memory 20 may also be located internal to processor 12, or any combination of internal and external memory. System 10 may further include a sensor (e.g., an accelerometer, heart rate sensor, etc.) coupled to processor 12 that generates input data.

Although shown as a bracelet in FIG. 1, system 10 may be any other type of wearable device (e.g., armband, glove, jacket, vest, pair of glasses, shoes, belt, etc.). System 10 may also be a handheld device, such as a cellular telephone, personal digital assistant ("PDA"), smartphone, computer tablet/pad, gaming console, etc., or may be any other type of device that includes a haptic effect system that includes one or more actuators or other type of haptic effect output devices. In various embodiments, not all elements shown in FIG. 1 are required for implementation.

Actuator 18 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 18 (not illustrated in FIG. 1). Actuator 18 is an example of a haptic effect output device configured to output haptic effects, such as vibrotactile haptic effects, electrostatic friction haptic effects, or deformation haptic effects, in response to a drive signal.

In one embodiment, system 10 includes hardware/software that physically measures, and/or is configured with the necessary parameters, to determine the energy being used (i.e., "energy monitoring") whenever the haptic system is energized and generating haptic effects. Known manners of monitoring energy usage can be used. In these embodiments, where energy monitoring is implemented, module 22 specifies an "energy budget." The energy budget can be specified in the form of the following example power consumption management modes:

(1) A required energy usage rate. For example, average Watts, mAh/day, etc.
(2) A required energy cap. For example, specifying that the haptic system is allocated 10 mAh to use specifically for haptics, from a certain time period onward, with no specific time limit, until another new allocation is received at some arbitrary later time.
(3) A time-based energy use profile. For example, a profile that specifies using 10 mAh from 6 am to 10 pm, and using 0 mAh (i.e., no power) from 10 pm to 6 am.
(4) A sensor-based energy use profile. For example, if an accelerometer is used to measure a wearable device's level of movement, to determine whether the wearer is sleeping, sedentary, active, or very active, the required energy budget could be specified as "unlimited energy when very active, 10 mAh/day when active, 5 mAh/day when sedentary, 1 mAh/day when sleeping". Alternately, a wearable device with a light sensor could determine light/dark states and set different profiles for those states. Further, a wearable device with a heart rate sensor could set an energy use profile that depends on heart rate.

In embodiments without the ability to monitor energy usage or in addition to the previously described embodiments, embodiments can provide haptic effect power management as the following example power consumption management modes:

(1) Power level setting. For example, a power level setting of full/medium/low/off would affect the power used to generate tactile sensations. A "full" setting would use more power for a given haptic effect than medium, "medium" would use more power than "low", and "off" would disable all haptic effects. A generated haptic effect would likely result in a slightly different sensation, based on the power level setting. The power level can be changed in one embodiment by modifying the magnitude parameter of the haptic effect.
(2) Usage limit setting. For example, module 22 can specify that "the total number of effects played during one 24 hour period is not to exceed 100", or "the haptic system must not be energized more than 1 minute per day in total", or "use full power for the first 120 seconds of haptic system use, followed by medium power for the next 120 seconds of haptic system use, followed by low power thereafter".
(3) Battery level-mapped power level. In embodiments that have an accurate battery state of charge ("SoC") measurement, the SoC can be periodically provided to the haptic system, and the haptic system energy budget can be mapped to power level. For example, "use full power when SoC is greater than 50%, use medium power when SoC is between 50% and 10%, and use low power when SoC is below 10%."
(4) Processor activity-mapped limit. For example, the haptic energy budget can be adjusted based on the level of processor usage, where processor usage maps to power consumption. For example, "use 10 mAh/day when the processor is greater than 50% busy over a 10-minute period, use 2 mAh/day when the processor is less than 50% busy over a 10-minute period."

In one embodiment, module 22 can manage haptic effect energy usage based on historical usage data. For example, a target power budget of 10 mAh/day can be specified. A feature that allows usage data to override a daily budget can be enabled, that monitors usage over time, and determines that Monday and Wednesdays are heavy usage days at 15 mAh/day, but Tuesday, Thursday and Friday are light, at 5 mAh/day. This implementation allows the overage on Mon and Wed because the average energy usage over the week is 9 mAh/day.

Figure 2:
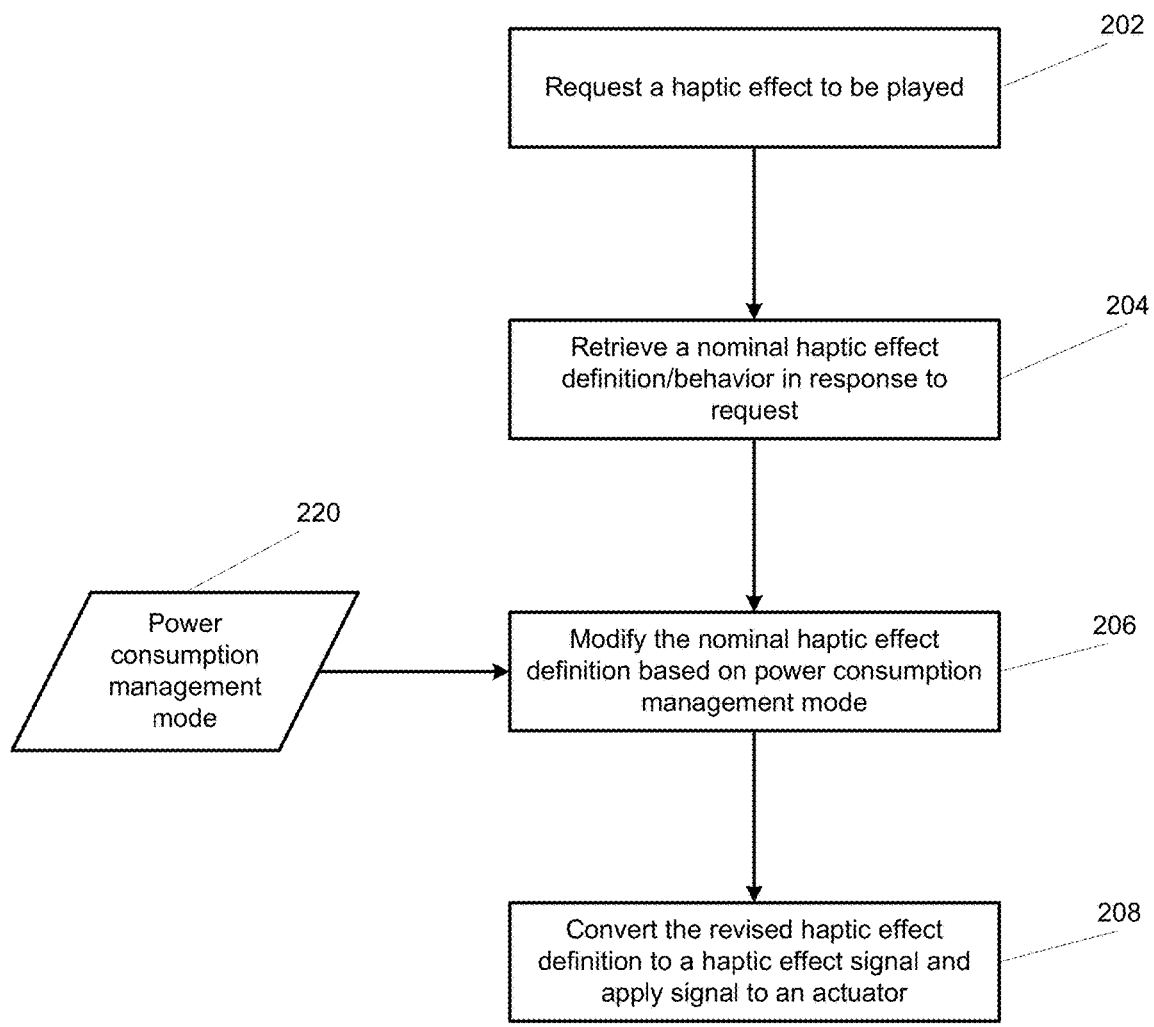
FIG. 2 is a flow diagram of the functionality of the haptic effects with power management module of FIG. 1 when providing haptic effects with power management in accordance with one embodiment.

FIG. 2 is a flow diagram of the functionality of haptic effects with power management module 22 of FIG. 1 when providing haptic effects with power management in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, a haptic effect to be played is requested. The haptic effect can be requested in response to an event, such as a calendar event, an incoming telephone call, a heart rate exceeding a predetermined limit, etc. The event can be generated externally to system 10, such as in response to a sensor input, or be generated internally.

At 204, the nominal haptic effect definition/behavior is retrieved. The nominal haptic effect definition is a defined haptic effect that typically would be provided in response to the request at 202 (i.e., before it is modified for power management purposes). The haptic effect definition can be defined by high level parameters such as magnitude, frequency and duration, or low level parameters. The nominal haptic effect definition can be pre-stored and retrieved, or generated on the fly.

Module 22 receives the power consumption management mode from 220. The power consumption management mode dictates the parameters of power management for haptic effects. Examples of power consumption management modes are disclosed above. Consistent with the received power consumption management mode, at 206 the nominal haptic effect definition received at 204 is modified. The modification can include a change in any of the levels of any of the parameters.

In one embodiment, a change in a parameter level could be an effective change in demanded strength or magnitude, where the strength output of the haptic effect is increased or decreased based on the power management mode. In another embodiment, the modification can be an effective change in demanded effect duration, where time durations of haptic effects are shortened to decrease the perceived strength. The reason for a duration decrease may be one of fidelity, where someone at rest may be able to detect finer-grained and shorter effects compared to someone performing rigorous exercise, for example. Another embodiment could change the effective character of the haptic sensation via the modification of a parameter such as playback rate or modulation rate, where a haptic effect drive signal is modulated at a high frequency, or in some other more complex fashion. The net result is a change in the character of the resultant haptic sensation, with a goal of optimizing power usage based on whatever decision mechanism for power management is applicable (e.g., level of physical activity, state of battery charge, etc.). In another embodiment, a selection among a finite set of effect definitions (i.e., those effect definitions being themselves collections of parameters or other types of output data sequences) is performed, where the finite set of effect definitions could be defined such that they represent low, medium, and high power versions of the haptic effect, for example.

At 208, the revised haptic effect definition is converted to a haptic effect signal and applied to actuator 18 or any other haptic effect output device and in response the haptic effect is generated on system 10.

As disclosed, power consumption management modes are applied to haptic effect definitions in order to modify the definitions and manage the power consumption of generated haptic effects. As a result, the haptic effects can be provided at a reduced power consumption and prolong the time between charges for many types of haptically-enable devices.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects on a haptically-enabled device that includes a haptic output device, the method comprising:
   retrieving, from a memory, a haptic effect definition in response to a request for a haptic effect, the haptic effect definition comprising a haptic effect parameter;
   receiving a power consumption management mode comprising an energy budget;
   determining an amount of energy used by the haptically-enabled device only when the haptically-enabled device is generating haptic effects;
   modifying the haptic effect definition, by changing the haptic effect parameter, to generate a modified haptic effect definition based at least in part on the amount of energy used by the haptically-enabled device when generating haptic effects in comparison to the energy budget;
   converting the modified haptic effect definition into a haptic effect signal; and
   generating, by the haptic output device, the haptic effect based on the haptic effect signal.

2. The method of claim 1, wherein the power consumption management mode comprises an energy usage rate.

3. The method of claim 1, wherein the power consumption management mode comprises a required energy cap that allocates a number of milliamp-hours to use for generating haptic effects from a predetermined time period onward.

4. The method of claim 1, wherein the power consumption management mode comprises a time-based energy usage profile.

5. The method of claim 1, further comprising:
   receiving input data from a sensor, and
   determining a level of movement of the haptically-enabled device based on the sensor input data, the level of movement corresponding to a level of activity of a wearer of the haptically-enabled device,
   wherein said modifying the haptic effect definition is further based, at least in part, on the level of movement of the haptically-enabled device.

6. The method of claim 1, wherein the power consumption management mode comprises a power level setting.

7. The method of claim 1, wherein the power consumption management mode comprises a usage limit setting that specifies one of:
   a total number of haptic effects to be generated within a predetermined time period;
   a total number of minutes per day to generate haptic effects; and
   a time-dependent haptic effect power setting that includes a maximum haptic effect power setting for use during a first predetermined time period, a medium haptic effect power setting for use during a second predetermined time period following the first predetermined time period, and a low haptic effect power setting for use after the second predetermined time period.

8. The method of claim 1, further comprising:
   receiving a measurement of a battery state of charge of the haptically-enabled device, wherein the power consumption management mode comprises a battery level-mapped power level based on the measurement.

9. The method of claim 1, further comprising:
receiving a measurement of a level of processor usage,
wherein the power consumption management mode comprises a processor activity-mapped limit based on the measurement.

10. A non-transitory computer-readable medium having instructions stored thereon that, when executed by a processor, cause the processor to generate haptic effects on a haptically-enabled device that includes a haptic output device, the instructions comprising:
retrieving, from a memory, a haptic effect definition in response to a request for a haptic effect, the haptic effect definition comprising a haptic effect parameter;
receiving a power consumption management mode comprising an energy budget;
determining an amount of energy used by the haptically-enabled device only when the haptically-enabled device is generating haptic effects;
modifying the haptic effect definition, by changing the haptic effect parameter, to generate a modified haptic effect definition based at least in part on the amount of energy used by the haptically-enabled device when generating haptic effects in comparison to the energy budget;
converting the modified haptic effect definition into a haptic effect signal; and
generating, by the haptic output device, the haptic effect based on the haptic effect signal.

11. The non-transitory computer-readable medium of claim 10,
wherein the power consumption management mode comprises one of an energy usage rate, a required energy cap, a time-based energy usage profile, a power consumption management mode, a power level setting or a usage limit setting,
wherein the required energy cap allocates a number of milliamp-hours to use for generating haptic effects from a predetermined time period onward, and
wherein the usage limit setting comprises one of:
a total number of haptic effects to be generated within a predetermined time period;
a total number of minutes per day to generate haptic effects; and
a time-dependent haptic effect power setting that includes a maximum haptic effect power setting for use during a first predetermined time period, a medium haptic effect power setting for use during a second predetermined time period following the first predetermined time period, and a low haptic effect power setting for use after the second predetermined time period.

12. The non-transitory computer-readable medium of claim 10, wherein the instructions further comprise:
receiving input data from a sensor,
determining a level of movement of the haptically-enabled device based on the sensor input data, the level of movement corresponding to a level of activity of a wearer of the haptically-enabled device,
wherein said modifying the haptic effect definition is further based, at least in part, on the level of movement of the haptically-enabled device.

13. The non-transitory computer-readable medium of claim 10, wherein the instructions further comprise:

receiving a measurement of a battery state of charge of the haptically-enabled device,
wherein the power consumption management mode comprises a battery level-mapped power level based on the measurement.

14. The non-transitory computer-readable medium of claim 13, wherein the instructions further comprise:
receiving a measurement of a level of processor usage,
wherein the power consumption management mode comprises a processor activity-mapped limit based on the measurement.

15. A haptically-enabled device, comprising:
a haptic output device;
a memory; and
a processor, coupled to the haptic output device and the memory, configured to:
retrieve, from the memory, a haptic effect definition in response to a request for a haptic effect, the haptic effect definition comprising a haptic effect parameter,
receive a power consumption management mode comprising an energy budget,
determine an amount of energy used by the haptically-enabled device only when the haptically-enabled device is generating haptic effects,
modify the haptic effect definition, by changing the haptic effect parameter, to generate a modified haptic effect definition based at least in part on the amount of energy used by the haptically-enabled device when generating haptic effects in comparison to the energy budget,
convert the modified haptic effect definition into a haptic effect signal, and
send the haptic effect signal to the haptic output device,
wherein, in response to receiving the haptic effect signal, the haptic output device generates the haptic effect based on the haptic effect signal.

16. The haptically-enabled device of claim 15, wherein the haptic output device is an actuator, and the haptic effect comprises a vibratory haptic effect.

17. The haptically-enabled device of claim 15,
wherein the power consumption management mode comprises one of an energy usage rate, a required energy cap, a time-based energy usage profile, a power consumption management mode, a power level setting or a usage limit setting,
wherein the required energy cap allocates a number of milliamp-hours to use for generating haptic effects from a predetermined time period onward, and
wherein the usage limit setting comprises one of:
a total number of haptic effects to be generated within a predetermined time period,
a total number of minutes per day to generate haptic effects, and
a time-dependent haptic effect power setting that includes a maximum haptic effect power setting for use during a first predetermined time period, a medium haptic effect power setting for use during a second predetermined time period following the first predetermined time period, and a low haptic effect power setting for use after the second predetermined time period.

18. The haptically-enabled device of claim 15, further comprising:
a sensor coupled to the processor;
wherein the processor receives input data from the sensor, wherein the processor determines a level of movement of the haptically-enabled device based on the sensor input data, the level of movement corresponding to a level of activity of a wearer of the haptically-enabled device, and wherein said modify the haptic effect definition is further based, at least in part, on the level of movement of the haptically-enabled device.

19. The haptically-enabled device of claim 15, further comprising:

a battery state of charge measurement device coupled to the processor, wherein the power consumption management mode comprises a battery level-mapped power level based on a measurement received from the battery state of charge measurement device.

* * * * *